Sept. 25, 1956 H. GRAYSON ET AL 2,764,688

ELECTRIC TRIGGER CIRCUITS

Filed Dec. 15, 1953 2 Sheets-Sheet 1

Inventor
H. GRAYSON —
A.E. BREWSTER — T.H. WALKER
By [signature]
Attorney

ELECTRIC TRIGGER CIRCUITS

Filed Dec. 15, 1953 2 Sheets-Sheet 2

Inventor
H. GRAYSON –
A.E. BREWSTER – T.H. WALKER
By [signature]
Attorney

United States Patent Office 2,764,688
Patented Sept. 25, 1956

2,764,688

ELECTRIC TRIGGER CIRCUITS

Harry Grayson, Arthur Edward Brewster, and Thomas Harold Walker, London, England, assignors to International Standard Electric Corporation, New York, N. Y.

Application December 15, 1953, Serial No. 398,364
Claims priority, application Great Britain December 23, 1952
13 Claims. (Cl. 250—36)

The present invention relates to electric two-condition trigger circuits, such as may be used, for example, in electric counting circuits or pulse amplifiers.

Electric trigger circuits are well known employing electron discharge devices or relays having two different stable or temporarily stable conditions which can be triggered by pulses from one condition to the other. In recent years a number of such circuits employing rectifiers or crystal triodes as the two-condition devices have been proposed.

Previously known trigger circuits employing crystal triodes have usually depended for their operation on the presence of current gain in the crystal triodes used. However some types of crystal triodes do not produce a current gain, although they do produce a power gain; this generally depends on the values of the internal impedances present in the crystal triode.

The object of the present invention is to provide circuit arrangements in which crystal triodes not having a current gain may be employed as the two-condition devices.

This object is achieved according to the invention by providing an electric trigger circuit comprising an amplifying device arranged to be capable of assuming two different current conditions, means for generating an alternating current, means for triggering the device from one condition to the other, and means for utilising the alternating current for holding the device in one of the said conditions.

It should be understood that in the case of circuits according to the invention, it is the power gain of the device which is used; crystal triodes having a current gain also have a power gain, as already stated, and so crystal triodes may be used whether they have a current gain or not.

In the preferred embodiments of the invention, the amplifying device comprises a crystal triode. In one of these embodiments the crystal triode is arranged to oscillate when it has been triggered to one of its two conditions, thereby holding it in that condition, so that the crystal triode itself also generates the above-mentioned alternating current. In another embodiment, two crystal triodes are employed, and are connected in a two-condition trigger circuit to which the alternating current is supplied for holding it in either of the two current conditions.

In the preferred embodiments of the invention, any suitable known form of crystal triode may be used. A crystal triode will be assumed to comprise a portion of a semi-conducting crystal, germanium, for example, having at least three electrodes in contact with the crystal, called respectively the emitter, collector and base electrodes. When the device is used as an amplifier, the emitter electrode is an input electrode, and is normally polarised in the forward or low-resistance direction with respect to the base electrode, and the collector electrode is an output electrode and is normally polarised in the reverse or high resistance direction with respect to the base electrode.

In the embodiments of the invention to be described below, the base electrode will be supposed to be connected to ground, and two grounded direct-current sources for the emitter and collector electrodes will be provided in any convenient way.

It will also be assumed for clearness that the crystal triode which will be used is of the usual kind in which, for operation as an amplifier, the emitter and collector electrodes are respectively polarised positively and negatively with respect to the base electrode. However, since in the embodiments of the invention the initial condition of the circuit will usually be such that the emitter current is cut off, the emitter electrode will in certain cases be provided with a negative polarising source.

The embodiments of the invention will be described with reference to the accompanying drawings in which.

Figure 1:
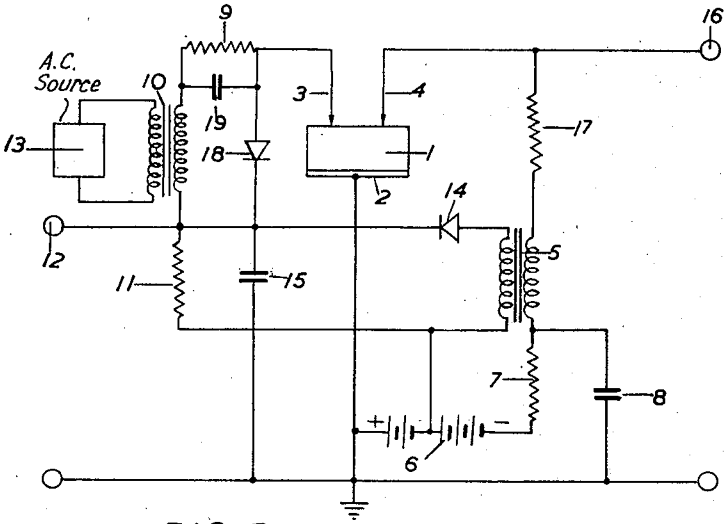
Fig. 1 shows a schematic circuit diagram of an embodiment employing an external alternating current source.

Referring to Fig. 1, the circuit employs a single crystal triode 1, having a grounded base electrode 2, and emitter and collector electrodes 3 and 4. The collector electrode 4 is connected through the primary winding of an output transformer 5 to a grounded negative source 6 which may, for example, have a potential of 45 volts. A decoupling resistor 7 and capacitor 8 may be included in conventional manner, if desired.

The emitter electrode 3 is connected to a tapping point on the source 6 supplying a potential of about 6 volts, for example, through a circuit including, in order, a relatively small current limiting resistor 9, the secondary winding of an input transformer 10, and a relatively large feed resistor 11. The emitter current is thus initially substantially cut off, and there will be a corresponding relatively small collector current. An input terminal 12 for a triggering potential is connected to the junction point between the secondary winding of the transformer 10 and the feed resistor 11.

A source 13 of alternating current (which will, for convenience, be called the carrier current) is connected to the primary winding of the input transformer 10. The frequency of this alternating current should be large compared with the frequency at which the trigger circuit is to be switched; the carrier frequency may, for example, be somewhere in the range of 10 kilocycles per second to 1 megacycle per second. The carrier current source 13 may, for example, be a conventional oscillator employing a separate crystal triode.

The negative cut-off potential applied to the emitter electrode 3 should be sufficient to ensure that the emitter current is substantially cut off in the presence of the applied carrier current. In this condition the crystal triode cannot amplify and will be said to be blocked, or in the "off" condition.

If a sufficiently large positive triggering potential be applied to the input terminal 12, the emitter electrode 3 will be unblocked, and the crystal triode will be switched into a condition in which it can amplify the carrier current. This will be called the unblocked or "on" condition.

The secondary winding of the output transformer 5 has one terminal connected to the lower end of resistor 11 and the other terminal connected through a rectifier 14 of any suitable type to the input terminal 12, which terminal is also connected to ground through a storage capacitor 15. The rectifier 14 is directed in such manner that when the circuit is triggered into the "on" condition, the amplifier carrier wave is rectified to charge the storage capacitor 15 positively, thus providing an auxiliary positive potential for the emitter electrode which holds the circuit in the "on" condition after the original triggering potential has been removed.

Thus the circuit may be triggered from the "off" condition to the "on" condition by the application of a short positive pulse to the input terminal 12, and is thereafter held in the "on" condition by the auxiliary positive potential produced by the rectified carrier current amplified by the crystal triode. The circuit may subsequently be triggered back to the "off" position by the application of a negative pulse to the input terminal 12 of sufficient amplitude to overcome the positive potential produced by the rectifier 14. The emitter current being thereby cut off, the crystal triode ceases to amplify, the auxiliary positive potential disappears, and the circuit then remains in the "off" condition. Thus the circuit may be triggered alternately "on" and "off" by the application of alternately positive and negative pulses to the input terminal 12. Corresponding output pulses may be taken from any convenient point in the circuit; for example, from a terminal 16 connected to the collector electrode, provided that a suitable load resistor, such as 17, be included in the collector circuit.

The resistor 11 should not be small enough unduly to load the rectifier 14. It could be omitted if the reverse resistance of the rectifier is sufficiently small compared with the reverse resistance of the emitter electrode contact, since in this case the reverse resistance of the rectifier could serve as the bias feed resistor for the emitter electrode. Alternatively, the rectifier 14 could be shunted by a suitable resistor (not shown) or a second rectifier (also not shown) could be inserted directly in series with the emitter electrode 3 and directed to be blocked or unblocked when the emitter contact is blocked or unblocked.

The arrangement which has just been described is liable to be uncertain in operation if the level of the carrier current is variable, because if the level increases, it may unblock the emitter contact when the circuit is in the "off" condition, thus triggering it to the "on" condition. This may be avoided by connecting a further rectifier 18 directly between the emitter electrode 3 and the input terminal 12, and shunting the current limiting resistor 9 with a storage capacitor 19. The rectifier 18 is directed to conduct when the emitter electrode 3 is positive to the input terminal 12, and the arrangement generates a potential in the storage capacitor 19 which prevents the emitter electrode from becoming positive to the input terminal if the carrier level increases. The elements 18 and 19 are, however, not essential and could be omitted if the carrier current is constant.

It will be understood that so long as the crystal triode 1 has a power gain, the winding ratio of the output transformer 5 may be chosen so that the device will trigger reliably whether the crystal triode has a current gain or not. The arrangement is relatively insensitive to changes in the polarising voltages, and the crystal triode may be operated under very safe working conditions, so ensuring long life and reliability.

Figure 2:
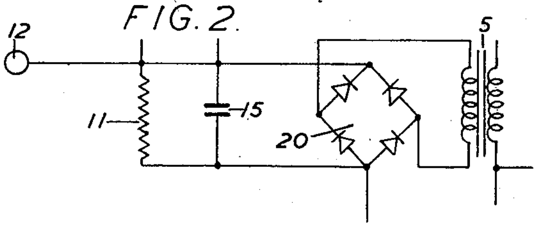
Fig. 2 shows a minor modification of part of Fig. 1.

The single rectifier 14 may be replaced by a full-wave rectifying arrangement in the manner indicated by Fig. 2, which shows the corresponding modification of that part of Fig. 2 associated with the transformer 5. A conventional bridge 20 of four rectifiers has one diagonal connected across the secondary winding of the transformer 5, and the other diagonal across the resistor 11. The lower end of the capacitor 15 is connected to the lower end of resistor 11 instead of the ground, as in Fig. 1, which is otherwise unaltered. The rectifiers in the bridge 20 should be directed so that the upper plate of the capacitor 15 is charged positively to the lower plate.

According to a second embodiment of the invention, the carrier current source is dispensed with, and the carrier waves are generated by the crystal triode itself when in the "on" condition, acting as an oscillator. The operation is otherwise basically the same as that of the first-described embodiment.

Figure 3:
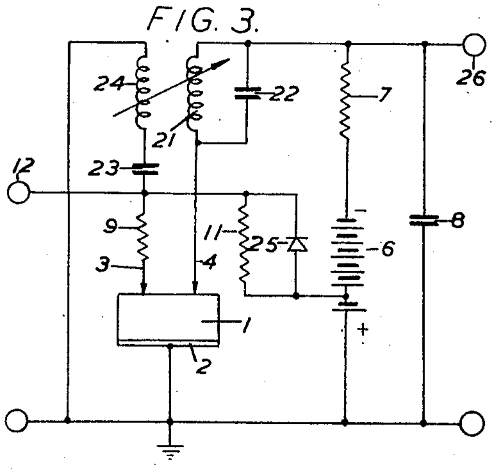
Fig. 3 shows a schematic circuit diagram of another embodiment which provides the alternating current by generating oscillations in the circuit.

Referring to Fig. 3, which shows the circuit of this embodiment, the collector electrode 4 is connected through a parallel resonant circuit comprising an inductor 21 and a capacitor 22, and an optional decoupling resistor 7 shunted by a grounded capacitor 8, to the negative polarising source 6, which may have a potential of 45 volts, for example. The emitter electrode 3 is connected to ground through a relatively small current limiting resistor 9, a large storage capacitor 23, and an inductor 24 coupled to the inductor 21. The emitter electrode 3 is also connected to a tapping point on the source 6 (providing, for example, a polarising potential of about 1½ volts) through the already-mentioned currents limiting resistor 9 and through a relatively large feed resistor 11 shunted by a rectifier 25. An input terminal 12 for triggering pulses is connected to the junction point between the elements 9 and 23.

In the "off" condition, the emitter current is substantially cut off by the negative potential derived from the source 6, and the crystal triode 1 cannot oscillate. If now a positive triggering pulse is applied to the input terminal 12, the emitter contact is unblocked and the crystal triode 1 oscillates (the coupling between the inductors 21 and 24 being of course so poled that positive feedback is produced). The oscillations are rectified by the rectifier 25, which is poled so that the charge built up in the storage capacitor 23 biases the emitter electrode 3 positively, thus overcoming the normal negative polarising voltage. The crystal triode 1 is then maintained in the oscillating condition which is the "on" condition. If now a negative pulse is applied to the input terminal 12, the emitter current is cut off, the oscillations must cease, and the circuit returns to the "off" position.

Figure 4:
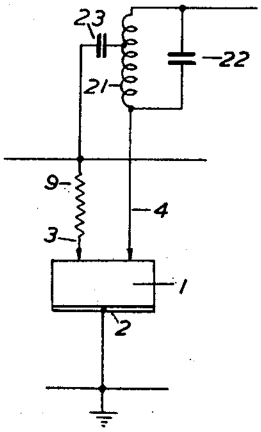
Fig. 4 shows a minor modification of part of Fig. 3.

According to a slight modification of Fig. 3 shown in Fig. 4, the inductor 24 is omitted, and the emitter electrode is connected through the storage capacitor 23 to a tapping point on the inductor 21, thereby forming a different type of oscillation circuit. It will be understood that the other parts of Fig. 3 not shown in Fig. 4 are unaltered.

As in the case of the embodiment of Fig. 1, the frequency of the generated oscillations (which correspond to the carrier wave of that embodiment) may, for example, be between 10 kilocycles per second and 1 megacycle per second.

An output signal or pulse in response to the triggering of the circuit can be derived in several ways. The alternating potential present at certain points (e. g. at the collector electrode) in the "on" condition can be used with or without rectification. The direct currents in the two conditions are different and can be used to indicate the state of the circuit. For example, output pulses could be derived from the potential variations across the decoupling resistor 7 obtained from an output terminal 26 connected to the upper end of resistor 7, as shown in Fig. 3.

This embodiment has similar advantages to the embodiment of Fig. 1, and it has the additional advantage that no external carrier current source is required.

Figure 5:
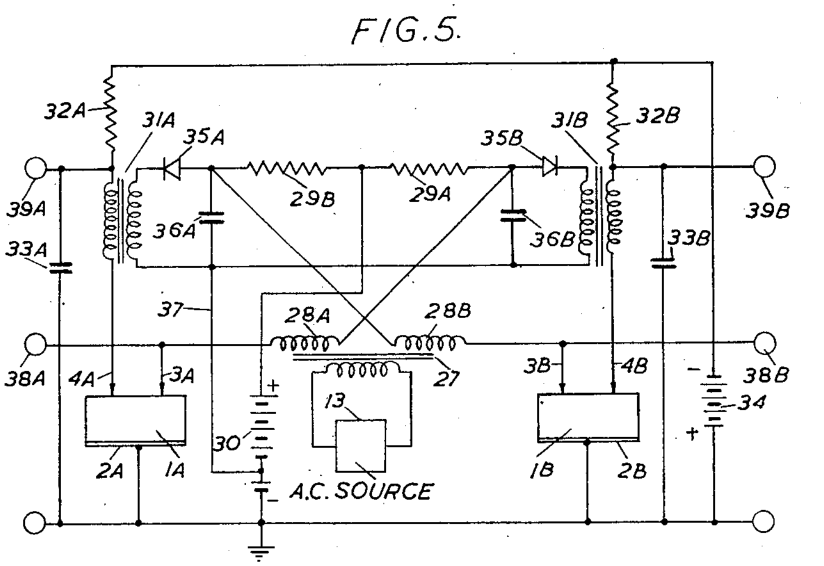
Fig. 5 shows a schematic circuit diagram of a third embodiment of the invention in the form of a "flip-flop" type of circuit.

According to a third embodiment of the invention, the circuit of which is shown in Fig. 5, two crystal triodes (denoted 1A and 1B) are arranged in a two-condition trigger circuit, stable in both conditions. A source 13 of a carrier current is connected through an input transformer 27 having two similar secondary windings 28A and 28B. The emitter electrodes 3A and 3B of the crystal triodes are connected respectively through the secondary windings 28A and 28B and feed resistors 29A and 29B to a polarising source 30, which in this case is positive and may have a potential of about 20 volts. Two similar output transformers 31A and 31B are provided for the crystal triodes 1A and 1B. The collector electrodes 4A and 4B of the crystal triodes are respectively connected through the primary windings of the corresponding output transformers 31A and 31B and decoupling resistors 32A and 32B, with grounded shunt capacitors 33A and 33B, to the negative polarising source 34, which may have a potential of 60 volts, for example.

Rectifiers 35A and 35B and storage capacitors 36A and 36B, are connected respectively in series across the secondary windings of the output transformers 31A and 31B. The junction point of elements 35A and 36A is connected through the secondary winding 28B to the emitter electrode 3B of the crystal triode 1B. Likewise the junction point of elements 35B and 36B is connected through the secondary winding 28A to the emitter electrode 3A of the crystal triode 1A.

The lower ends of elements 36A and 36B are also connected over conductor 37 to a tapping point on the source 30 which supplies a small positive potential.

This circuit can assume one of two conditions, called the "first" and "second" conditions, the first condition being that in which crystal triode 1A is in the "off" state, and the second condition being that in which crystal triode B is in the "off" state, the other crystal triode in each case being "on." In the first condition, crystal triode 1A cannot amplify and so the emitter electrode 3B of crystal triode 1B has a positive potential applied to it from the source 30. Crystal triode 1B therefore amplifies the carrier current supplied from the source 13 through the secondary winding 28B of the input transformer. This current is rectified by the rectifier 35B which is poled in such manner that the storage capacitor 36B acquires a negative potential which is applied to the emitter electrode 3A of the crystal triode 1A, and counteracts the normal positive potential supplied by the source 30, thereby cutting off the emitter current and placing the crystal triode 1A in the "off" condition, as first assumed.

The small positive potential supplied over conductor 37 ensures the blocking of the rectifier 35A when the crystal triode 1A is cut off. Since the emitter electrode 3A is negative in this condition, it may be sufficient to connect the conductor 35 to ground.

By applying a positive triggering pulse to an input terminal 38A connected to the emitter electrode 3A of crystal triode 1A, the emitter circuit is unblocked, and the crystal triode 1A assumes the "on" condition, and amplifies the carrier current which is then rectified by the rectifier 35A to provide a negative counteracting potential which is applied to the emitter electrode 3B of crystal triode 1A, which therefore assumes the "off" condition and no longer amplifies the carrier current derived from the secondary winding 28B of the input transformer. The negative counteracting potential applied to the emitter electrode 3A of the crystal triode 1A is thus removed, thereby maintaining the unblocked condition produced by the triggering pulse. The circuit is thereby switched over the second condition. A positive pulse applied to terminal 38B connected to the emitter electrode 3B of crystal triode 1B will then switch the circuit back to the first condition.

Output A. C. or D. C. signals or pulses in response to the switching of the circuit between the two conditions can evidently be obtained from various points in the circuit. For example, as in Fig. 3, output terminals 39A and 39B may be connected to the upper ends of the capacitors 33A and 33B, and pulses corresponding to the changes in potential drop across resistors 32A and 32B can be obtained from these output terminals.

It will be noted that the polarising arrangements are such that each of the rectifiers 35A and 35B is blocked when the corresponding crystal triodes 1A and 1B are respectively in the "off" condition.

According to a slight modification of these arrangements, the resistors 29A and 29B and the upper portion of the source 30 are removed, the rectifiers 35A and 35B being shunted by corresponding equal resistors (not shown) through which a small positive bias from the conductor 37 is fed to the emitter electrodes 3B and 3A. In this arrangement each rectifier will automatically be blocked when the corresponding crystal triode is in the "off" condition.

Figure 6:
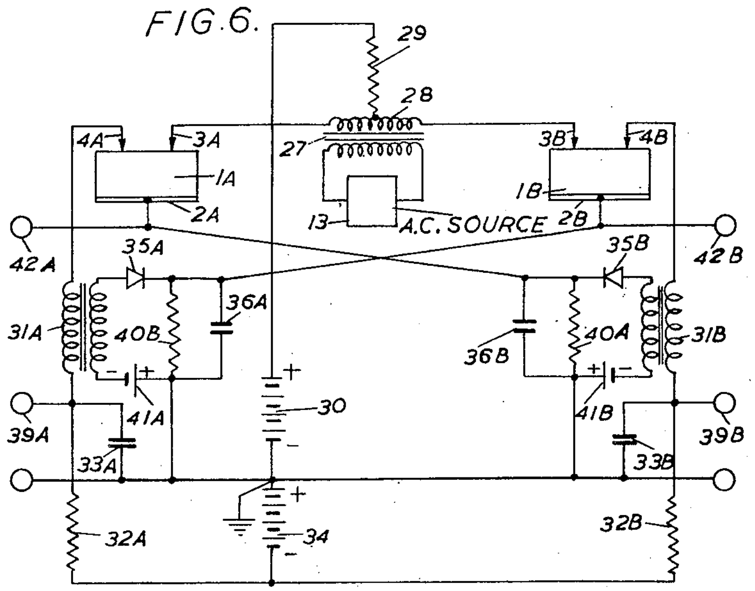
Fig. 6 shows a modification of Fig. 5.

According to a different form of the third embodiment shown in Fig. 6, the base electrodes 2A and 2B of the two crystal triodes 1A and 1B are connected to ground through respective resistors 40A, 40B shunted respectively by the capacitors 36B and 36A. The input transformer 27 has in this case a single centre-tapped secondary winding 28 which is connected at opposite ends to the emitter electrodes 3A and 3B of the two crystal triodes 1A and 1B. The centre tap is connected through a feed resistor 29 to the positive polarising source 30 for the emitter electrodes. The collector electrodes 4A and 4B are connected as in Fig. 5, but the secondary winding of the output transformer 31A has one end connected to the base electrode 2B of the crystal triode 1B through a rectifier 35A, and the other end to ground through a source 41A of small negative polarising potential. Likewise, the secondary winding of the output transformer 31B has one end connected to the base electrode 2A of the crystal triode 1A through a rectifier 35B, and the other end to ground through a similar source 41B. The sources 41A and 41B could be derived from a suitable tapping on the source 34. In some cases they may be omitted.

Each of the rectifiers 35A, 35B is directed so that when the corresponding crystal triode 1A, 1B is in the "on" condition the amplified carrier waves are rectified to produce a positive potential which is applied to the base electrode of the other crystal triode, thus cutting off the emitter current and placing it in the "off" condition. The circuit then operates substantially similarly to the circuit of Fig. 5.

It may be added that the use of the negative sources 41A and 41B will block each rectifier when the corresponding crystal triode is in the "off" condition, and the base current of the other crystal triode then flows through the corresponding base resistor. However, if desired, the two base resistors 40A and 40B may be omitted (leaving the capacitors 36A and 36B to serve as storage capacitors for the rectifiers), and in that case the sources 41A and 41B should be omitted, the secondary windings of the two output transformers 31A and 31B being connected directly to ground. Then the base current of each crystal triode when in the "on" condition flows through the rectifier corresponding to the other crystal triode, which rectifier will be unblocked.

Input terminals 42A and 42B are shown connected to the base electrodes 2A and 2B of the crystal triodes 1A and 1B. The circuit may be triggered from one condition to the other by applying a negative pulse to the base electrode of the crystal triode which is in the "off" condition. Output pulses may be obtained from the output terminal 39A or 39B which are connected as in Fig. 5.

The crystal triodes which may be used in all the embodiments of the invention, as described above, can be of the type in which the emitter and collector electrodes are sharply pointed wires or cat whiskers, the base electrode being a metal coating or holder making low resistance contact with the semi-conducting crystal. Alternatively they may be of the type in which the semi-conducting crystal consists of several portions or regions of alternately P- and N-conductivity types, with P-N junctions between the respective sections, the electrodes all consisting of metal coatings or the like making low resistance contact with respectively different sections or regions of the semi-conducting crystal.

Furthermore, although it has been assumed above for clearness that the crystal triodes used are of the type in which the emitter and collector electrodes have to be polarised respectively positively and negatively with respect to the base electrode, the opposite type could be used, in which case all polarities and all rectifiers mentioned above should be reversed.

While the principles of the invention have been described above in connection with specific embodiments, and particular modifications thereof, it is to be clearly understood that this description is made only by way of example and not as a limitation on the scope of the invention.

What we claim is:

1. An electric two-condition trigger circuit comprising an amplifying device arranged to be capable of assuming two different current conditions, means for generating an alternating current, means for triggering said device from one condition to the other, and means operated by said device for utilising the alternating current for holding said device in one of the said conditions.

2. An electric trigger circuit capable of assuming two different current conditions, comprising an amplifying device arranged to be blocked in one of the said conditions and unblocked in the other, means for applying a signal to unblock the said amplifying device, means for causing said amplifying device to generate oscillations when unblocked, and means for applying the generated oscillation to maintain said amplifying device in the unblocked condition after the disappearance of the signal.

3. An electric two-condition trigger circuit comprising two similar amplifying devices connected in such manner that when one is blocked the other is unblocked, and vice-versa, a source of alternating current, means for applying a signal to trigger the circuit from one condition to the other, so that one of the said devices is switched to the blocked condition, and means operated by the other of said devices for applying the alternating current to maintain blocked the device which has been switched to the blocked condition, after the disappearance of the triggering signal.

4. An electric two-condition trigger circuit comprising a crystal triode arranged to be blocked in one condition of the circuit, a source of alternating current connected to the crystal triode, means for applying a signal to unblock the crystal triode in such manner that it amplifies the alternating current, means for rectifying the amplified alternating current, and means for supplying the rectified voltage so obtained to one of the electrodes of the crystal triode for maintaining it in the unblocked condition.

5. An electric two-condition trigger circuit comprising a crystal triode arranged to be blocked in one condition of the circuit, an oscillation circuit connected with the crystal triode whereby it generates oscillations when unblocked, means for applying a signal to unblock the crystal triode, means for rectifying the generated oscillations, and means for applying the rectified voltage so obtained to one of the electrodes of the crystal triode for maintaining it in the unblocked condition.

6. A circuit, according to claim 4, further comprising means for initially blocking the crystal triode by the application of a bias potential to the emitter electrode in such direction as to bias the emitter contact in the high resistance direction, and in which the means for applying the rectified voltage to the emitter electrode applies said voltage in such direction as to counteract the said bias potential, whereby the emitter contact is then biased in the low resistance direction.

7. An electric two-condition trigger circuit comprising two crystal triodes interconnected in such manner that when either one is blocked the other is unblocked, a source of alternating current connected to the input circuit of each crystal triode, whereby the alternating current is amplified by the crystal triode which is unblocked, means connected to the output of each crystal triode for rectifying the alternating current which it amplifies when unblocked to produce a bias potential, means for applying the bias potential to maintain the other crystal triode in a blocked condition, and means for applying a triggering signal to unblock the last-mentioned crystal triode for switching the trigger circuit to the opposite condition.

8. A circuit, according to claim 7, in which the bias potential is applied to the emitter electrode of the crystal triode which is maintained blocked.

9. A circuit, according to claim 7, in which the bias potential is applied to the base electrode of the crystal triode which is maintained blocked.

10. A circuit, according to claim 4, in which the amplified alternating current is passed through a transformer before rectification.

11. An electric two-condition trigger circuit comprising a crystal triode oscillation circuit, means for blocking said oscillation circuit in the initial condition, whereby no oscillations can be generated, means for applying a signal to unblock the crystal triode, and means for applying the oscillations produced by said circuit to maintain the crystal triode in the unblocked condition.

12. An electric two-condition trigger circuit comprising a source of carrier waves, two crystal triode amplifiers arranged in such a manner that only one of them is capable of amplifying the carrier waves at one time, means for applying the carrier waves amplified by one crystal triode to prevent the other from amplifying, and means for applying a signal to interchange the conditions of the two amplifiers.

13. A circuit, according to claim 5, further comprising means for initially blocking the crystal triode by the application of a bias potential to the emitter electrode thereof in such direction as to bias the emitter contact in the high resistance direction, and in which the means for applying rectified voltage to the emitter electrode applies said voltage in such direction as to counteract the said bias potential, whereby the emitter contact is then biased in the low resistance direction.

References Cited in the file of this patent

UNITED STATES PATENTS

| | | |
|---|---|---|
| 2,594,449 | Kircher | Apr. 29, 1952 |
| 2,622,212 | Anderson et al. | Dec. 16, 1952 |
| 2,627,039 | MacWilliams | Jan. 27, 1953 |
| 2,676,271 | Baldwin | Apr. 20, 1954 |